United States Patent [19]

Iwashita et al.

[11] 4,350,424
[45] Sep. 21, 1982

[54] CAMERA ASSEMBLY WITH AUTOMATIC WINDING MECHANISM

[75] Inventors: Tomonori Iwashita, Fuchu; Tadahide Fukushima, Kamakura, both of Japan

[73] Assignee: Canon Kabushiki Kaisha, Tokyo, Japan

[21] Appl. No.: 303,119

[22] Filed: Sep. 17, 1981

Related U.S. Application Data

[63] Continuation of Ser. No. 974,374, Dec. 29, 1978, abandoned.

[30] Foreign Application Priority Data

Feb. 7, 1978 [JP] Japan .................................. 53-12747
Feb. 7, 1978 [JP] Japan ............................. 53-14311[U]

[51] Int. Cl.³ .............................................. G03B 1/12
[52] U.S. Cl. .................................................. 354/173
[58] Field of Search ............... 354/170, 171, 173, 288, 354/295

[56] References Cited

U.S. PATENT DOCUMENTS

| 3,520,391 | 7/1970 | Graham et al. | 354/173 X |
| 3,820,148 | 6/1974 | Osanai | 354/170 X |
| 3,882,516 | 5/1975 | Ogiso et al. | 354/173 |
| 3,995,292 | 11/1976 | Kondo | 354/173 |
| 4,110,770 | 8/1978 | Lange | 354/288 X |
| 4,167,314 | 9/1979 | Ishiyanagi et al. | 354/173 |

Primary Examiner—Michael L. Gellner
Attorney, Agent, or Firm—Toren, McGeady & Stanger

[57] ABSTRACT

A camera assembly including a motor drive unit is formed with a base casing having a very small thickness dimension which conforms to and is removably mounted on the bottom panel of the camera housing. A grip fixedly secured to the base casing and upwardly extending along the right front corner of the camera housing facilitates stable manual holding of the camera, and also houses an electric motor located internally within the grip. A speed reduction gear train located within the base casing connects the motor to a film winding mechanism in the camera housing, and a battery is located in an attachment casing removably mounted on the bottom of the base casing by a locking device which enhances the portability of the camera by facilitating removal of the attachment casing from the base casing. An electromagnetic clutch provided between the gear train and the electric motor to control automatic driving of the camera and to minimize electrical energy consumption is also located in the grip to contribute to the compactness of the motor drive unit.

9 Claims, 10 Drawing Figures

CAMERA ASSEMBLY WITH AUTOMATIC WINDING MECHANISM

This is a continuation of Ser. No. 974,374, filed Dec. 29, 1978, now abandoned.

BACKGROUND OF THE INVENTION

The present invention relates to camera assemblies having automatic winding devices, and more particularly to a camera assembly having an automatic winding device with an electric motor as a drive source for performing film winding and shutter cocking operation.

It is known in the art to provide an automatic winding device for a photographic camera in the form of an attachment with a setscrew adapted to engage with a mating thread which is formed in the bottom wall of the camera housing in order to enable the camera to be supported by a tripod. This attachment accommodates an electric motor and a speed reduction gear mechanism, with a battery serving as the electrical power source, particularly when the camera is portable and capable of being carried about. However, the combined bulk and weight of the electric motor, the gear mechanism and the battery detract from the portability and ease of manipulation of the camera and make operation thereof difficult to perform. Although the performance characteristics of the electric motor and battery have recently been improved, since the driving torque necessary to effect shutter cocking and film winding remains considerable, a speed reduction mechanism is not yet indispensable to automatic operation of the camera. In order to insure that a continuous succession of frame exposures can be effected with highly accurate and reliable film feed and exposure control even with significant increase in frame frequency, it is required that the dimensions of the electric motor and the battery be increased. This requirement is, however, inconsistent with improving the compactness of the automatic winding device itself.

If the motor drive is housed at the bottom of the camera housing, it constitutes a heavy weight suspended downwardly from the camera, increasing the difficulty of maintaining the camera sufficiently stable without use of a support device such as a tripod. A conventional solution of this problem is to provide a hollow grip in fixedly-secured relation to the housing of the winding device so that the electric motor may be situated in the internal space of the grip with or without the battery. By grasping the grip, the user is able to hold the camera sufficiently stable to focus upon an object which it is desired to photograph.

Another problem of conventional motor driven winding devices is low efficiency in driving the electric motor. In general, the automatic winding process comprises the steps of detecting completion of advance of one frame of the film by a torque sensor, de-energizing the motor, and after completion of the next exposure, energizing the motor to initiate the next cycle of winding operation. Since the motor must be stopped rapidly and must then increase its speed rapidly at the start, while driving the speed reduction mechanism and the film winding mechanism, a large proportion of the electrical energy in the battery is consumed inefficiently by the inertia of these mechanisms.

To enhance the efficiency of the motor, it has been proposed to utilize an automatic winding device having an electromagnetic clutch associated with the motor. According to this proposal as applied in high-speed photography applications, the motor is maintained energized throughout a series of continuous frame exposures and operation of the electromagnetic clutch is controlled to start transmission therethrough of the motor drive, and to terminate transmission after completion of an exposure and after each cycle of winding operation. Thus, large power losses which might otherwise result from the inertia of moving parts of the mechanism during rapid speed increase or braking of the motor are eliminated.

However, the provision of the electromagnetic clutch causes an increase in the weight and bulk of the motor drive unit, and the amount of electrical energy consumed by the electromagnetic clutch is not negligible. Thus, other disadvantages arise because failure to make the motor drive unit as compact as possible will seriously detract from the ease of operation of the camera.

SUMMARY OF THE INVENTION

It is an object of the present invention to avoid many conventional drawbacks of prior art cameras and to provide a motor drive unit for a camera which is improved from the point of view of both manageability and portability.

One feature of the present invention resides in that a motor drive unit is provided with a handle or grip having an internal space in which at least an electric motor and an electromagnetic clutch are contained, while a speed reduction gear train is arranged in the output stage of the electromagnetic clutch, whereby the part of the motor drive unit housing which is adapted to extend along the bottom panel of the camera housing and to contain the gear train can be made extremely thin to facilitate compactness of the motor driven camera assembly.

By another feature of the invention, the weight and bulk of the electromagnetic clutch is itself reduced by the arrangement of the clutch between the gear train and the electric motor whereby a small driving torque of the motor may be later increased to a significant extent by the gear train. This effects reduced power loss of the battery and contributes to the compactness of the motor drive unit.

Other objects and features of the present invention will become apparent from the following detailed description of a preferred embodiment of the invention taken in conjunction with the accompanying drawings.

DESCRIPTION OF THE PREFERRED EMBODIMENT

Figure 1:
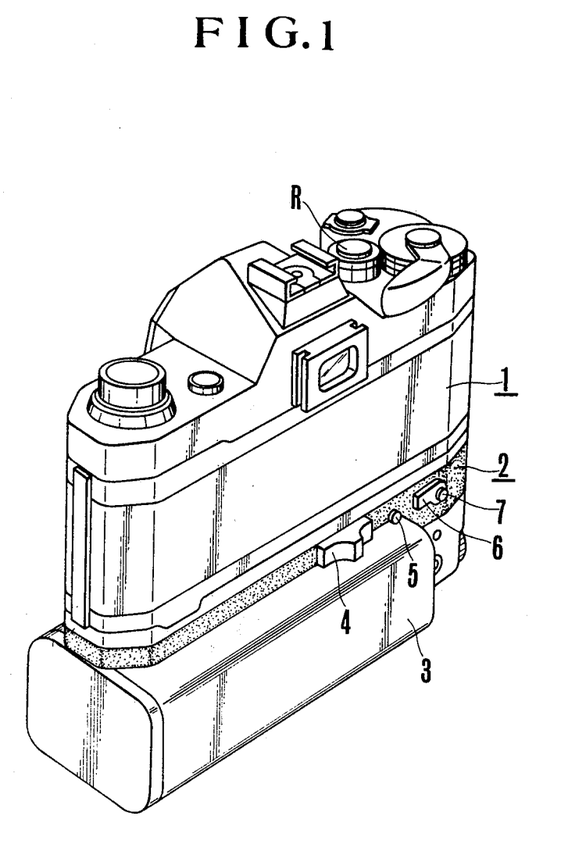
FIG. 1 is a perspective view of one embodiment of the present invention as seen from the rear of a single lens reflex camera having a motor drive unit.

The camera assembly of the invention is shown in FIG. 1 as comprising a camera housing 1 having mounted thereon a base casing 2 of a motor drive unit of the camera. An electrical power source or battery is contained in an attachment casing 3. To remove the attachment casing 3 from the base casing 2, depression of a button 5 is followed by movement of a slideable knob 4 to the right with the resultant detached position being shown in FIG. 6. After that, a setscrew 8 is rotated by means of a knob 10 to dismount the base casing 2 from the camera housing 1 with the resultant position being shown in FIG. 2.

Figure 2:
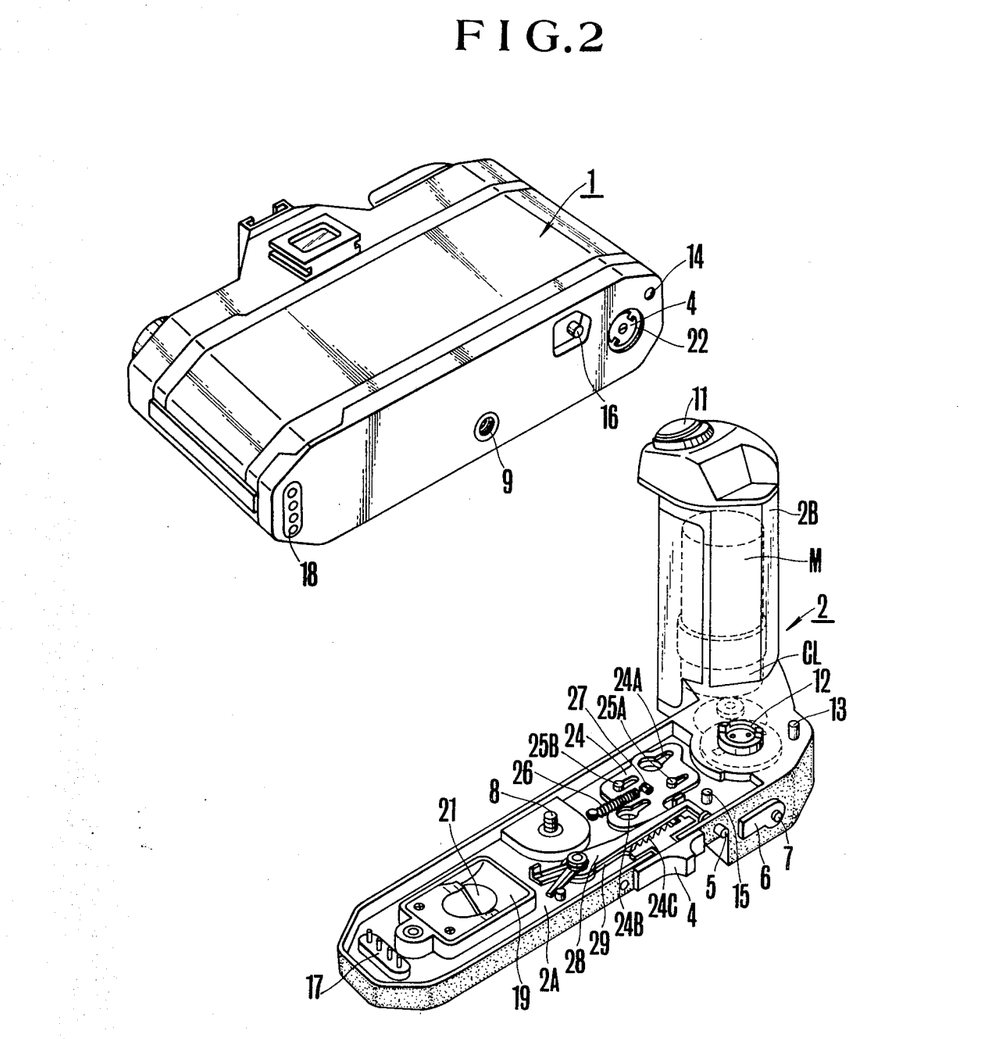
FIG. 2 is an exploded perspective view showing the structure of the bottom panel of the camera and the arrangement of the motor drive unit of FIG. 1.

As shown in FIG. 2, the base casing 2 is comprised of a relatively thin plate-like member 2A having a small thickness dimension with an upper surface shaped to conform to the bottom panel of the camera housing 1, and with a grip part 2B molded integrally therewith and upwardly extending along the right front corner of the camera housing 1. An electric motor M and an electromagnetic clutch CL are contained in an internal space of the grip part 2B, with a speed reduction gear train (see FIG. 3) being contained in the part 2A near the grip part 2B, and terminating at a drive coupler 12 arranged to engage a driven coupler 22 in a round recess of the camera housing 1 when the camera is mounted on the part 2A at a position adjusted by a pin 13 engaging in a fitted hole 14. The base casing 2 is rigidly secured to the camera body 1 by a setscrew 8 engaging in a threaded opening 9. In this position, a movable pin 15 is aligned with a rewind control pin 16. After a button 7 is depressed, a lever 6 is rotated in a clockwise direction to project the pin 15 upwardly so that a sprocket (not shown) is released from positive connection with the driven coupler 22. A number of plugs 17 are inserted into respective jack holes 18 to establish signal transmitting channels between the camera and the motor drive unit. A receptor 19 with a spring 20 is provided for preventing a dust-proof cap 21 from being lost after it is removed from the round recess within which it is contained.

Figure 3:
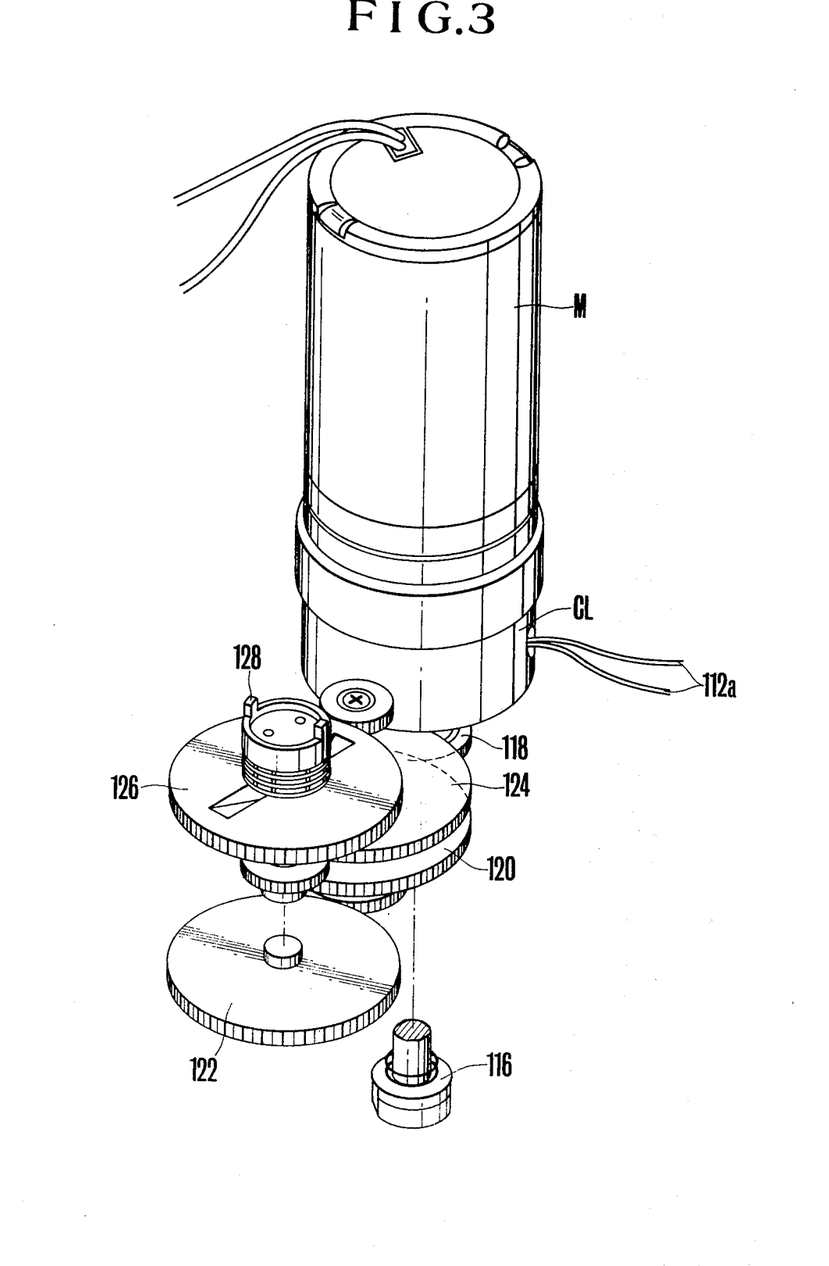
FIG. 3 is a perspective view showing an arrangement of an electric motor, an electromagnetic clutch and a speed reduction gear train in the base casing of FIG. 2.
Figure 4:
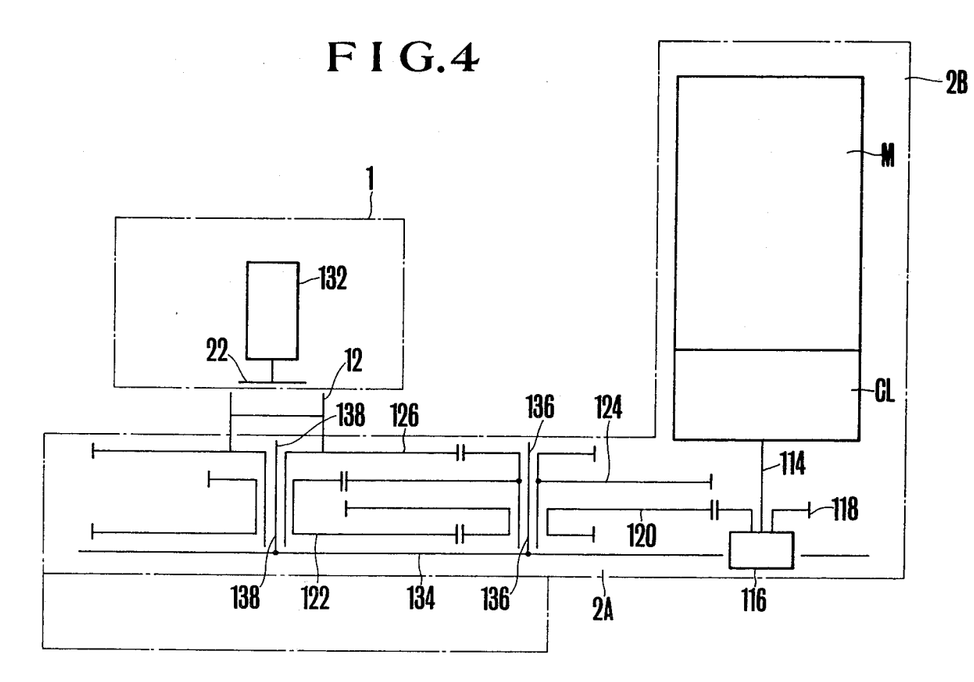
FIG. 4 is a schematic diagram showing the relative positions of the individual gears constituting a transmission mechanism between the motor and a film winding mechanism in the camera housing.
Figure 5:
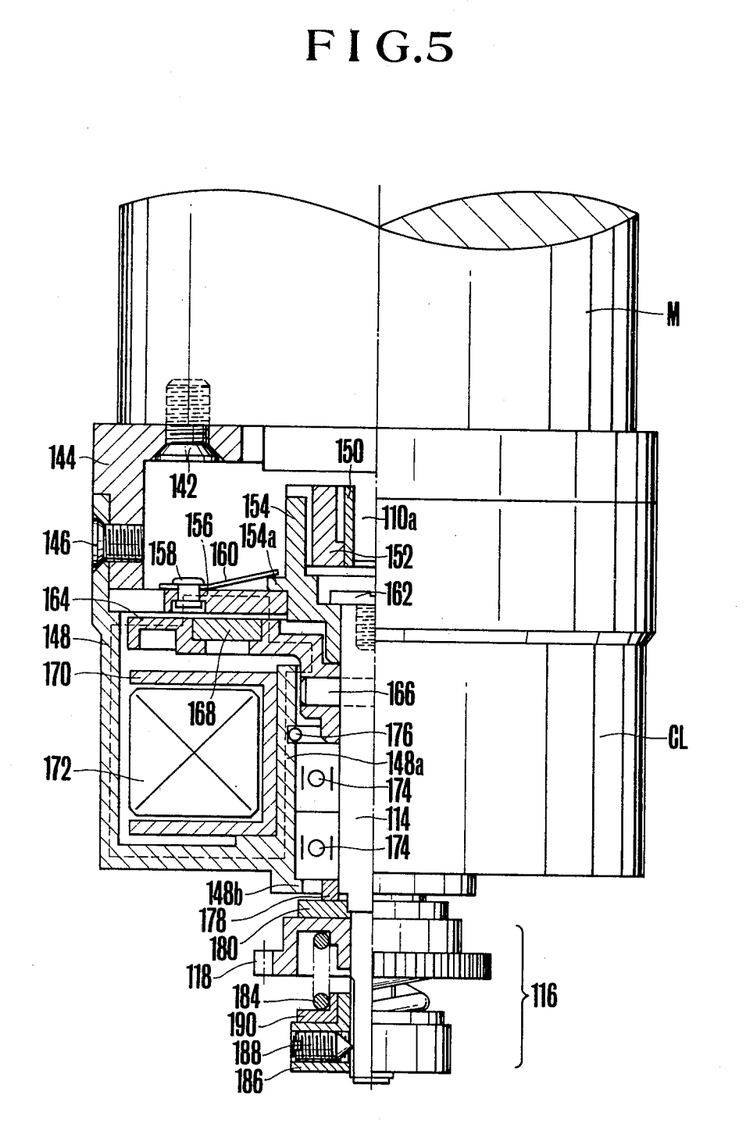
FIG. 5 is a partially sectioned side elevation of the electromagnetic clutch and a slip mechanism.

FIGS. 3 to 5 show a mechanism for transmitting motion of the energized motor M through the energized clutch CL and through a gear train to the film winding and shutter cocking mechanism 132 in the camera housing 1. In FIGS. 3 and 4, a clutch shaft 114 is drivingly connected through a slip mechanism 116 to a slip gear 118 meshing with an upper gear of a first two-stage gear 120 with a lower gear meshing with an upper gear of a second two-stage gear 122. The first and second two-stage gears 120 and 122 are rotatable about shafts 136 and 138 respectively which are fixedly mounted on the bottom panel 134 of the base casing 2A. The gear train further includes a gear 126 meshing with the upper gear 124 and fixedly carrying the drive coupler 128 thereon.

In FIG. 5, the motor M and the electromagnetic clutch CL are shown assembled together through a collet 144 by means of screw fasteners 142 and 146. The motor M has an output shaft 110a on which a spindle 154 is mounted through a shaft guide 150 and through an Oldham's coupling 152. The spindle 154 has a radial flange 154a on which is movably seated an armature 156 under the action of a plate spring 160 affixed at one end to the armature 156 by fasteners 158, the other end of which bears on the upper edge of the radial flange 154a to urge the armature 156 for upward movement.

The electromagnetic clutch CL is housed in a field core 148, and the driven shaft 114 is rotatably mounted on an internal tubular portion 148a through a pair of bearings 174 which are fixedly secured between a shoulder 148b and a ring fastener 176, and it is freely fitted into a clamped portion of the driving spindle 154 by a capped screw 162. A rotor 164 fixedly mounted on the driven shaft 114 by a pin 166 has a circular groove formed in the upper surface thereof to receive a frictional member 168 of nonmagnetic material in fixedly secured relation at a location opposite to the armature 156. A bobbin 170 for a magnetic coil 172 is fixedly fitted on the outer surface of the tubular portion 148a of the field core 148.

The slip mechanism 116 comprises: a frictional disc 180 affixed to the clutch shaft 114 through a collar 178; a slip gear 118 pressed against the frictional disc 180 by an expansion helical spring 184 extending around the shaft 114; a slip nut 186 affixed to the shaft 114 by a screw 188 at a location such that the frictional force exerted by the spring 184 at the interface between the frictional disc 180 and the slip gear 118 is slightly larger than that necessary to drive the camera 1; and a flanged bushing 190 of frictional material between the spring 184 and the slip nut 186.

The operation of the mechanism of FIGS. 3 to 5 will be explained in connection with one cycle of film winding operation. With the magnet coil 172 remaining unenergized, the armature 156 is taken out of contact with the rotor 164 by the action of the spring 160 to create an air space of about 0.1 millimeter therebetween so that the driving torque of the spindle 154 is not transmitted to the driven shaft 114.

When an exposure has been completed, the magnetic coil 172 is energized to form a magnetic path indicated by arrows in the field core 148, rotor 164, and armature 156, since these members are made of magnetic material such as soft magnetic iron. The armature 156 is thereby attracted towards the rotor 164 against the force of the spring 160 and is frictionally engaged therewith.

Next, when the winding of the motor M is energized, motion of the output shaft 110a is transmitted through the shaft guide 150, Oldham's coupler 152, and armature 156 to the rotor 164 and from there it is further transmitted through the clutch shaft 114, slip nut 186, frictional bushing 190, and spring 184 to the slip gear 118. Since the film winding and shutter cocking mechanism 132 in the camera housing 1 is unlatched, no overload is applied to the slip gear 118 so that the driving torque of the slip gear 118 is transmitted through the gear train 120-126 to the drive coupler 12 and then further transmitted to the driven coupler 22. At the termination of the cycle of winding operation, a deactuating signal is produced to stop electrical power supply from the battery to the motor M and the electromagnetic clutch CL.

The rotation of the motor M is rapidly stopped by a braking means (not shown). The magnetic field of the electromagnetic clutch disappears, so that the armature 156 returns to the position illustrated in FIG. 5 by the action of the spring 160. The moment at which the motor M actually stops is delayed by the inertia of the motor from the moment at which the electrical power supply to the motor M has been cut off. At the same time, the electromagnetic clutch CL produces a time delay between the moment at which the magnet coil 172 has been de-energized and the moment at which the armature 156 is actually taken out of positive engagement with the rotor 164.

Because of these time delays, when the film winding and shutter cocking mechanism reaches the terminal end of movement, the driven coupler 22 suddenly changes its function to arrest forward movement of the gear train 120–126, slip mechanism 116, clutch CL and motor M, whereby a resulting shock is first imparted to the gear train. This shock is absorbed by the slip mechanism 116 so that it does not propagate into the clutch CL and motor M. In other words, the inertial motion of the clutch CL and motor M is slipped-off at the interfaces between the slip gear 118 and frictional member 180 and between the slip nut 186 and the frictional member 190.

Figure 6:
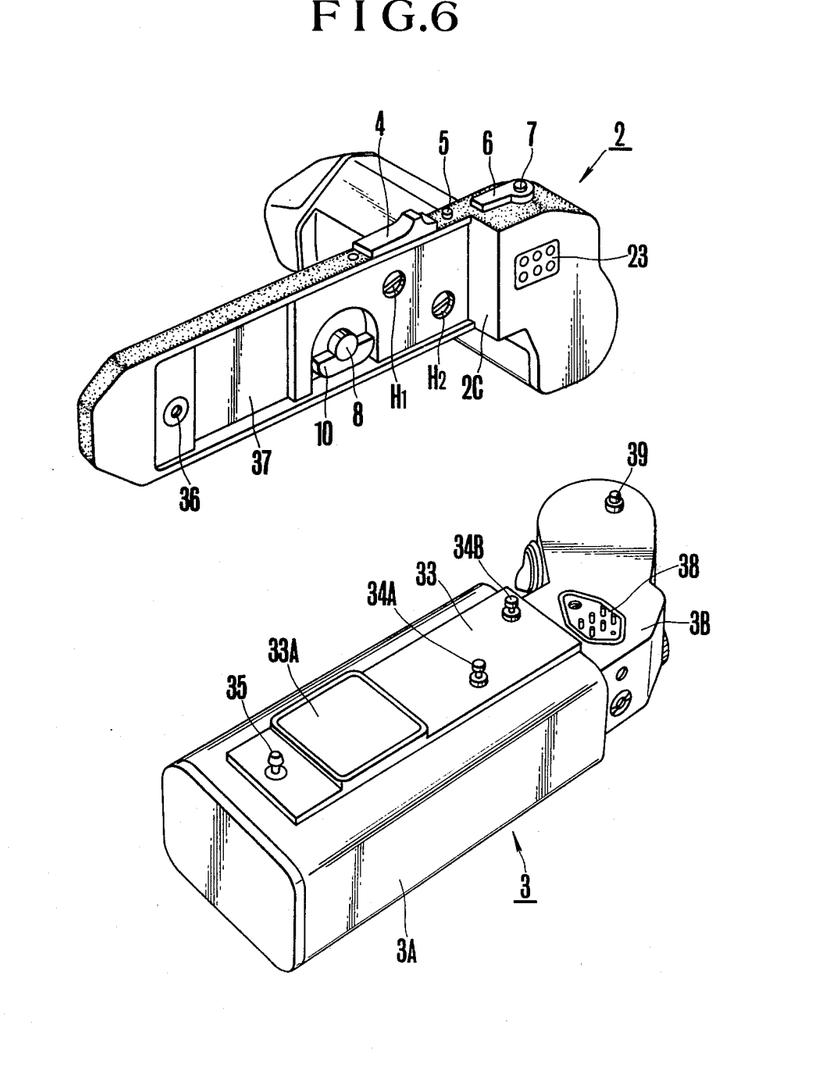
FIG. 6 is an exploded perspective view of the base casing and the attachment casing for a battery in a decoupled position.

In high-speed continuous photography applications, the power supply to the electromagnetic clutch CL and motor M may be otherwise controlled in such a manner that while the winding of the motor M is maintained energized throughout the entire period of continuous succession of frame exposures. The magnet coil 172 is energized and de-energized for each actuation and release of the film winding mechanism to thereby compensate for the otherwise necessary ramp time of movement of the motor M. For this purpose there is provided a control circuit shown in FIG. 9 mounted in the attachment casing 3. As shown in FIG. 6, the attachment casing 3 has a number of electrical interconnection terminals 38 arranged to engage with respective terminals 23 on the bottom panel of the base casing 2, when the attachment casing 3 is coupled to the basic casing 2.

Figure 7:
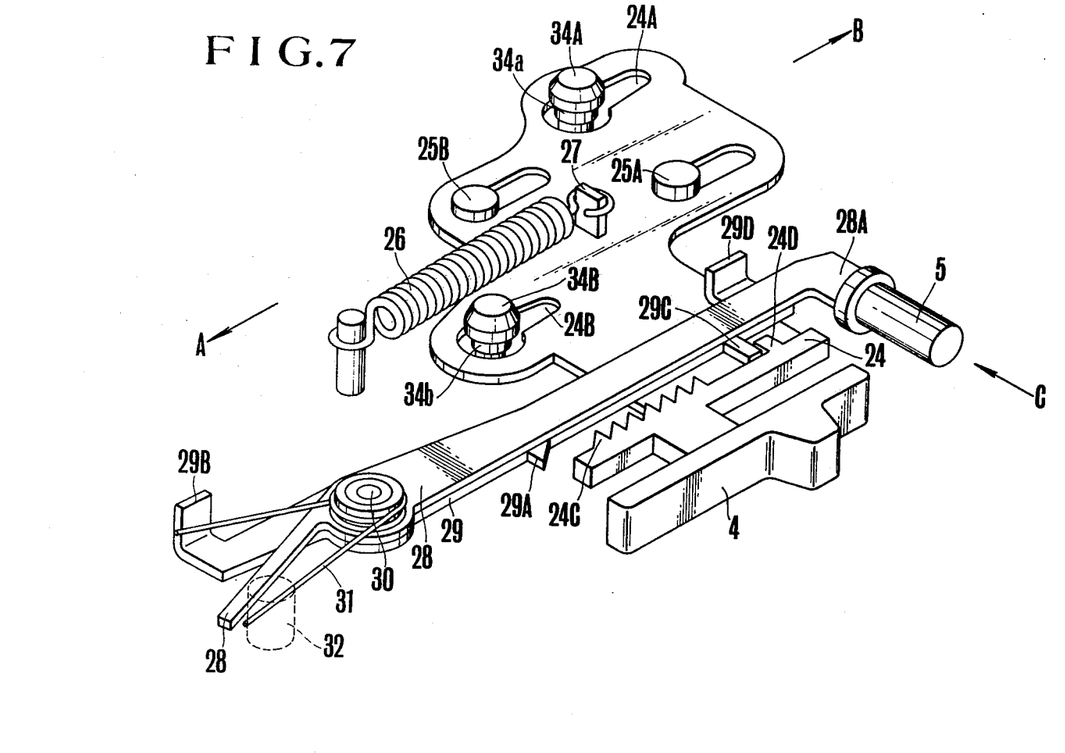
FIG. 7 is a perspective view of a locking device in a position where the attachment casing is about to be coupled with the base casing.
Figure 8:
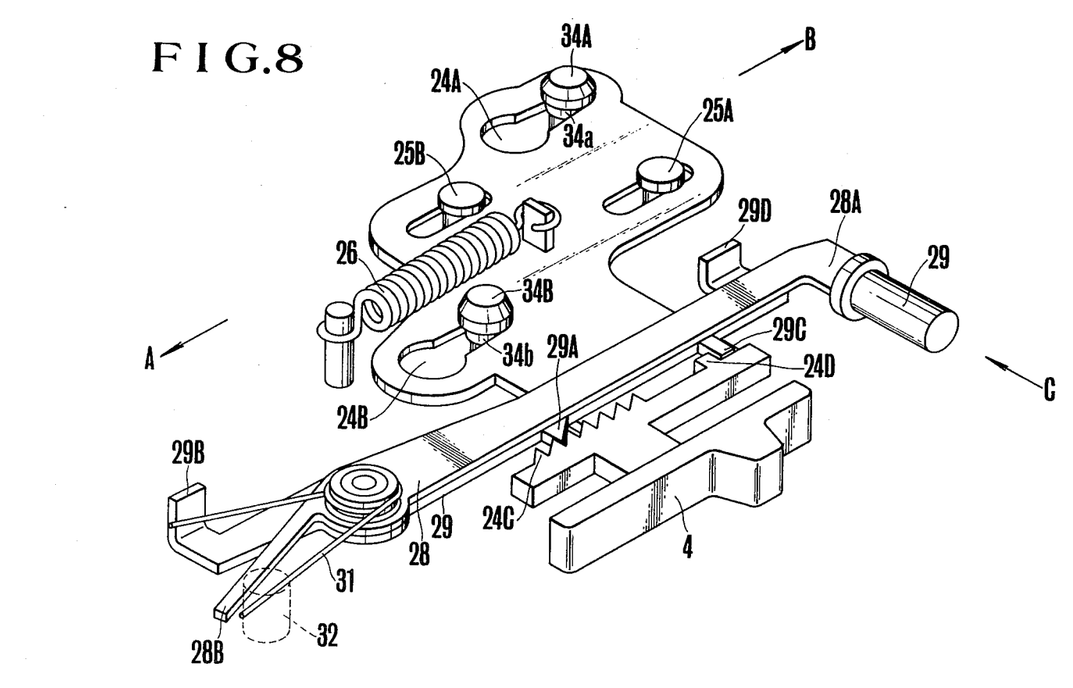
FIG. 8 is a view similar to FIG. 7 showing the effective position of the locking device.

To facilitate coupling and de-coupling operation of the attachment casing 3 to the base casing 2 there is provided a mechanism shown in FIGS. 6 to 8. In FIG. 7, the release button 5 of FIGS. 1 and 2 is fixedly mounted on one end 28A of a plastic lever 28 pivotal about a pin 30 about which is also pivotal a holding lever 29. When the button 5 is depressed in a direction indicated by arrow C against the self-biasing action of an arm 28B on the opposite end of lever 28 bearing on a stationary pin 32, the holding lever 29 is turned about the pivot pin 30 in a counterclockwise direction against the bias of a hairpin spring 31 by the release lever 28 engaging on an upwardly bent-off portion 29D, until a projection 29C is moved away from a lobe 24D of a locking member 24. When the projection 29C is disengaged from the lobe 24D, the locking member 24 is driven by a spring 26 acting on a projection 27 to move from the position of FIG. 7 to the position of FIG. 8 where a pawl 29A is engaged with one of the teeth 24C on the locking member 24 while being guided by pin-and-slot engagements 25A,25B.

As shown in FIG. 6, the attachment casing 3 consists of a battery chamber section 3A and a control circuit chamber section 3B, the latter being stepped down from the former to assist in adjusting the lateral position of the attachment casing 3 relative to the base casing 2.

Positioned on the upper surface of the section 3A is a rectangular plate 33 having a square relief 3A conformed to the recessed portion 37 of the base casing 2. On the plate 33 are a position adjusting pin 35 cooperative with a fitted hole 36 in the base casing 2, and two coupling members 34A and 34B arranged to extend through and outwardly beyond respective holes H1 and H2 and 24A and 24B as shown in FIGS. 7 and 8 when the attachment casing 3 is in contact with the base casing. The coupling members 34A and 34B are provided with tapered portions 34a and 34b so that when the locking member 24 is moved to the left, progressively narrower slots 24A and 24B pick up the coupling members 34A and 34B in rigidly secured relation to the base casing 2. To decouple the attachment casing 3 from the base casing 2, the operator first pushes the release button 5 and then moves the slideable knob 4 to the right.

Figure 9:
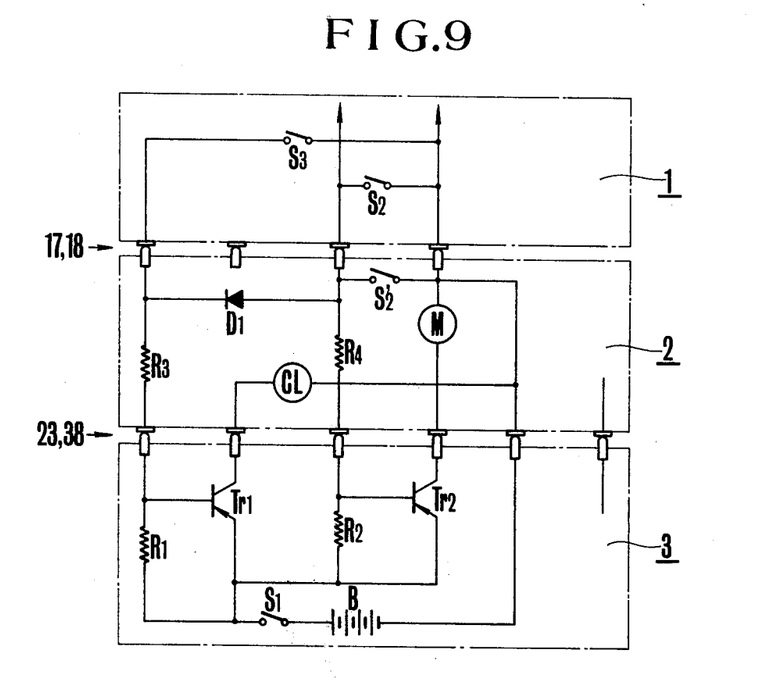
FIG. 9 is a schematic electrical circuit diagram of the motor drive unit.
Figure 10:
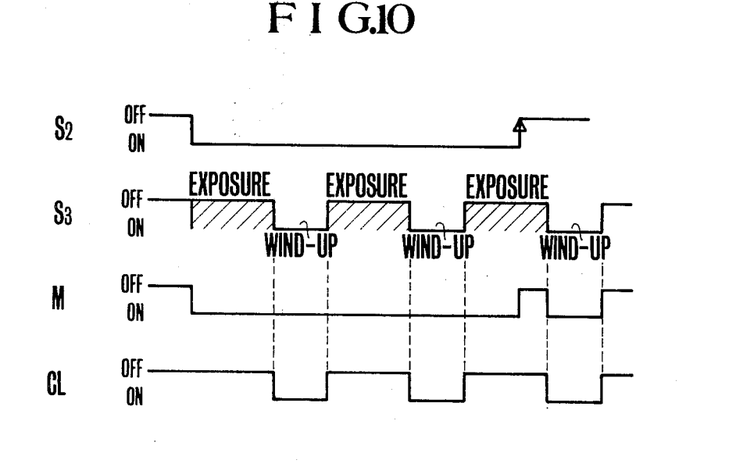
FIG. 10 is a timing chart showing the manner in which the various parts of the circuit of FIG. 9 operate.

FIG. 9 shows a control circuit for energizing and de-energizing the winding of the motor M and electromagnetic clutch CL (the magnet coil 172) including a battery B, with a negative terminal connected to one end each of the motor winding and electromagnetic clutch CL and with a positive terminal connected through a switch S1 to the other ends of the motor winding and magnet coil through respective power supply control transistors Tr2 and Tr1. The switch S1 is cooperative with an actuator 39 of FIG. 6 to be closed when the attachment casing 3 is coupled with the base casing 2. The bases of the transistors Tr1 and Tr2 are connected through resistors R1 and R2 to their emitters. Resistors R3 and R6 constitute a voltage divider, and are connected to each other through a diode D1. S2 is a switch arranged to be closed in response to depression of a camera release button R of FIG. 1 and connected in parallel with a switch S2' which is cooperative with a release button 11 on the base casing 2, and which is connected to a release circuit (not shown) of known construction for releasing latching connection of the camera, for example, by using an electromagnetic actuator in the camera housing 1. A switch S3 cooperates with a shutter mechanism or a mirror mechanism to be open during the exposure and film winding operation and to be closed when the exposure is terminated.

When the attachment casing 3 is coupled with the base casing 2, the switch S1 is closed to render the control circuit operative. When either one of the release buttons R or 11 is depressed, the switch S2 or S2' is closed to start energization of the motor winding M and at the same time to actuate the release circuit (not shown), while the electromagnetic clutch CL remains unenergized to cut off transmission of motion of the motor M to the gear train. When the exposure has been completed, the switch S3 is closed. With the release button R or 11 left depressed, upon closure of the switch S3, the transistor Tr1 is rendered conducting to start energization of the electromagnetic clutch CL, whereby motion of the motor M is transmitted through the clutch CL to the gear train 120–126. When the film (not shown) is transported by one frame, the switch S3 is opened to render the transistor Tr1 nonconducting again. So long as the release button R or 11 remains depressed, the motor M continues to rotate and the clutch CL is actuated for each termination of exposure.

When the release button R or 11 is moved to open the switch S2 or S3 at a point in time during the winding operation, termination of conduction of the transistor Tr2 is deferred by means of the diode D1 to continue energization of the motor winding and magnet coil.

Upon completion of the last cycle of winding operation, the switch S3 is opened to de-energize the motor winding and magnet coil.

The foregoing description of the operation of the motor drive unit has been set forth in connection with a continuous succession of frame exposures. For single frame operation, the operator may instantaneously depress the button R or 11.

It will be seen from the foregoing that the present invention utilizes the internal space in the grip for incorporation of the electric motor and electromagnetic clutch so that the base casing can be made as thin as possible to to provide great flexibility in arranging a speed reduction gear mechanism in the base casing. When the camera is combined with such a base casing, the portability and manageability of the complete camera assembly are significantly improved.

The arrangement of the electromagnetic clutch adjacent the output shaft of the motor gives rise to an advantage in minimizing the weight and bulk of the clutch and the amount of electrical energy consumed by the clutch, as a relatively small driving torque is involved. This advantage is significant from the viewpoint of the motor drive unit which is employed and the limited space capacity of the battery.

While a specific embodiment of the invention has been shown and described in detail to illustrate the application of the inventive principles, it will be understood that the invention may be embodied otherwise without departing from such principles.

What is claimed is:

1. A motor drive assembly for a photographic camera comprising a motor operated film winding unit and an electrical power source unit;

said motor operated film winding unit comprising
    (a) a base casing defining a mount surface,
    (b) a grip member mounted on the side of said base casing, said grip member defining an interior space,
    (c) electric motor means and electrically operated clutch means, both said motor means and said clutch means being contained within said interior space of said grip member, said electric motor means and said clutch means having housings which are of about the same diameter, said housings including connecting portions of approximately the same shape and being superposed on each other into one unified body and arranged in the longitudinal direction within the interior space of said grip member,
    (d) connecting means having connecting portions of approximately the same shape as the shape of said connecting portions of said motor means and clutch means housings, said connecting portions of said motor means housing and of said clutch means housing being inserted into corresponding connecting portions of said connecting means to form said unified body,
    (e) speed reduction means operatively connected to said electrically operated clutch means, with at least part of said speed reduction means being arranged within said base casing, and
    (f) film winding coupling means drivingly connected to the output of said speed reduction means and arranged in said base casing to cooperate with said camera;

said electrical power source unit comprising
    (g) an attachment casing having an electrical power source contained therein and defining an attachment surface,
    (h) first locking means arranged in said attachment surface of said attachment casing corresponding to said mount surface of said winding unit, and
    (i) electrical coupling means projecting from said attachment casing.

2. A drive assembly for a photographic camera including a camera housing having a bottom and film winding means located within said housing, said assembly comprising:
    a base casing extending along said bottom of said camera housing;
    a hollow grip member formed integrally with said base casing at one end thereof;
    drive means including an electric motor and an electromagnetic clutch both contained within the interior of said hollow grip member,
    said motor having a housing and a motor shaft,
    said clutch having a housing unitarily combined with said motor housing and a shaft,
    with coupling means being provided to connect said motor shaft and said clutch shaft with a slidable seat; and
    speed reduction means operatively connected with said electromagnetic clutch and housed at least in part within said base casing, said speed reduction means including
    film winding coupling means within said camera;
    said motor being provided with a driving rotation shaft and having said clutch arranged between said rotation shaft and said speed reduction means to transmit the driving force of said rotation shaft to said speed reduction means; said motor being further provided with connecting means fixed at said motor housing, said means being positioned between said motor housing and said electromagnetic clutch, said connecting means having a shape which is the same as the external shape of said clutch, said connecting means and said clutch housing being coupled together in fixed engagement.

3. A drive assembly according to claim 2 further including actuation control means positioned in the upper end of said grip member.

4. A drive assembly according to claim 2 further including cap receptor means positioned in said base casing to receive and hold a cap which is to be attached to said film winding means of said camera, said cap receptor means being positioned in a portion of said base casing not occupied by said speed reduction means.

5. A drive assembly according to claim 2 further including battery case fixing means arranged in said base casing to fixedly secure a battery case on the bottom of said base casing, said base casing being provided with terminal means for transmission of an electrical control signal, and said battery case having a control circuit disposed therein and being provided with second terminal means which is arranged thereon and can be connected to said terminal means.

6. A motor assembly according to claim 2 further including frictional transmission means arranged between said electromagnetic clutch and said speed reduction means.

7. A motor drive assembly for a photographic camera comprising a motor operated film winding unit and an electrical power source unit;
    said motor operated film winding unit comprising (a) a base casing defining a mount surface, (b) a grip member mounted on the side of said base casing, said grip member defining an interior space, (c) electric motor means and electrically operated clutch means, both said motor means and said clutch means being contained within said interior space of said grip member, said electric motor means and said clutch means having housings which are of about the same diameter, said housings being superposed on each other into one unified body and arranged in the longitudinal direction within the interior space of said grip member, (d) speed reduction means operatively connected to said electrically operated clutch means, with at least part of said speed reduction means being arranged within said base casing, and (e) film winding coupling means drivingly connected to the output of said speed reduction means and arranged in said base casing to cooperate with said camera;

said electrical power source comprising (f) an attachment casing having an electrical power source contained therein and defining an attachment surface, (g) first locking means arranged in said attachment surface of said attachment casing corresponding to said mount surface of said winding unit, and (h) electrical coupling means projecting from said attachment casing;

said film winding unit further comprising second locking means arranged within said base casing for engagement with said first locking means, said second locking means having bias means urging said second locking means into locking engagement, and locking control means holding said second locking means in a locking preparation position and operable upon actuation thereof to displace said second locking means into a locked position;

said motor drive assembly further comprising lock preparation operating means arranged to operatively couple with said second locking means when said locking control means operates to shift said second locking means to its locking preparation position against the force of said bias means.

8. A motor drive assembly according to claim 7 wherein said second locking means include a locking plate slidably movable along said base casing, said locking plate having wedge shaped openings adapted to be brought into locking engagement with said first locking means of said power source unit.

9. A motor drive assembly according to claim 7 wherein said speed reduction means is arranged on the same side of said base casing as said grip member and wherein coupling means project from said base casing in a direction parallel with said grip member in generally the same direction as that in which said grip member extends.

* * * * *